(12) United States Patent
Ludwig et al.

(10) Patent No.: US 7,435,039 B2
(45) Date of Patent: Oct. 14, 2008

(54) DEVICE FOR PRODUCING A PREDETERMINED ORIENTATION

(75) Inventors: Ralph Ludwig, Oberursel (DE); Andreas Rybarczyk, Hannover (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 10/551,020

(22) PCT Filed: Apr. 3, 2003

(86) PCT No.: PCT/DE03/01103

§ 371 (c)(1),
(2), (4) Date: May 30, 2006

(87) PCT Pub. No.: WO2004/089793

PCT Pub. Date: Oct. 21, 2004

(65) Prior Publication Data

US 2006/0239808 A1 Oct. 26, 2006

(51) Int. Cl.
*B65G 15/00* (2006.01)

(52) U.S. Cl. .......................... 406/88; 414/676

(58) Field of Classification Search ............... 414/676; 406/88

See application file for complete search history.

(56) References Cited

U.S. PATENT DOCUMENTS

| | | | | |
|---|---|---|---|---|
| 3,513,934 A * | 5/1970 | Crowley | ................. | 180/124 |
| 4,014,576 A * | 3/1977 | Druschel et al. | .............. | 406/38 |
| 4,462,720 A | 7/1984 | Lenhart | | |
| 4,563,635 A * | 1/1986 | Wagner et al. | .............. | 324/688 |
| 4,730,955 A * | 3/1988 | Lenhart | ................. | 406/88 |
| 4,730,956 A * | 3/1988 | Lenhart | ................. | 406/88 |
| 5,145,292 A * | 9/1992 | Bulso et al. | .............. | 406/88 |
| 5,222,840 A * | 6/1993 | Ingraham et al. | ........... | 406/88 |
| 5,611,648 A * | 3/1997 | Lenhart | ................. | 406/88 |
| 5,634,636 A * | 6/1997 | Jackson et al. | ............ | 271/225 |
| 5,788,425 A * | 8/1998 | Skow et al. | ............. | 406/88 |
| 5,820,306 A * | 10/1998 | Hilbish et al. | ........... | 406/88 |
| 5,868,549 A * | 2/1999 | Lee et al. | .............. | 414/791.6 |
| 5,984,591 A * | 11/1999 | Hilbish et al. | ........... | 406/88 |
| 6,224,298 B1 * | 5/2001 | Tsuji et al. | ............. | 406/88 |
| 6,315,501 B1 * | 11/2001 | Yagai et al. | ............. | 406/198 |
| RE37,532 E * | 1/2002 | Lenhart | ................. | 406/86 |
| 6,354,789 B2 * | 3/2002 | Takeuchi et al. | ........... | 414/676 |
| 6,494,646 B1 * | 12/2002 | Sala | ................. | 406/88 |
| 6,808,358 B1 * | 10/2004 | Mayerberg et al. | ........... | 414/676 |
| 7,004,711 B2 * | 2/2006 | Ikehata et al. | ............ | 414/676 |

FOREIGN PATENT DOCUMENTS

| | | |
|---|---|---|
| GB | 2275903 | 9/1994 |
| JP | 48 037880 | 6/1973 |

* cited by examiner

*Primary Examiner*—Douglas A Hess
(74) *Attorney, Agent, or Firm*—Fish & Richardson P.C.

(57) ABSTRACT

A device for realizing a predetermined orientation of singularized work pieces being transported on a sliding surface by means of an air current that acts upon the work pieces. The air current has an effective direction that is inclined relative to the moving direction of the work pieces in such a way that an air current resulting from the effective air current and the air current caused by the movement of the work pieces extends perpendicular to the moving direction of the work pieces. Since the resulting air current acts upon the work piece perpendicularly, optimal force ratios are achieved on the work piece such that a reliable orientation of the work pieces is ensured.

14 Claims, 1 Drawing Sheet

DEVICE FOR PRODUCING A PREDETERMINED ORIENTATION

TECHNICAL FIELD

The invention pertains to a device for realizing a predetermined orientation of singularized work pieces being transported on a sliding surface by means of an air current that acts upon the work pieces.

BACKGROUND

Devices of this type are utilized in aerodynamic feed systems. Aerodynamic feed systems make it possible to singularize work pieces from a chaotic heap and to orient the respective work pieces before they are delivered to downstream processing and installation systems in a defined position and with a predetermined orientation. The work pieces are oriented, in essence, by means of air currents that act upon the respective work pieces. In this case, various fluidic effects such as pulses, lift currents or current fields as well as different work piece properties such as, for example, the $C_w$-value, the surface texture, interior contour features, bores or the center of gravity are used for orienting the work pieces and for the feed process. The air currents are directed perpendicular to the moving direction of the work pieces in order to ensure that the work pieces are acted upon in a defined fashion by the air currents and to allow the utilization of work piece properties for the orientation thereof.

With respect to aerodynamic orientation processes, one can distinguish between three basic functional principles. These methods are categorized into air cushion systems, in which the orientation is realized on a plane air current, and special air currents for the axial and radial orientation. The work pieces can be aligned and therefore oriented on a plane air cushion by utilizing the $C_w$-value or the position of center of gravity. During the axial and radial orientation, the work piece slides down a sliding surface that is inclined about two axes and passes an air current during this process. When passing the air current, work pieces that are incorrectly oriented or positioned are turned or shifted into the correctly oriented position while correctly oriented work pieces pass the air current without being turned.

The inferior operational reliability of these feed devices is particularly disadvantageous in production processes. A plurality of incorrectly oriented work pieces passes the air current without being turned or correctly oriented work pieces are turned into an incorrectly oriented position. However, incorrectly oriented work pieces cause significant problems, particularly in the ensuing processing and installation systems, wherein these problems can lead to malfunctions and downtimes of the entire downstream production and installation system. Consequently, a control system is required for detecting and removing incorrectly oriented work pieces from the feed process. However, this additional expenditure significantly reduces the efficiency of the feed system.

SUMMARY

Based on these circumstances, the invention aims to make available an improved device for realizing a predetermined orientation of work pieces.

The invention proposes a device, in which the air current has an effective direction that is inclined relative to the moving direction of the work pieces in such a way that an air current resulting from the effective air current and the air current caused by the movement of the work pieces extends perpendicular to the moving direction of the work pieces. In other words, the inclined air current is superimposed on the air current caused by the movement of the work pieces such that the resulting air current acts upon the work piece exactly perpendicular. This makes it possible to achieve optimal force ratios on the work piece, and the properties of the work piece, for example, an asymmetry or a position of center of gravity, can be utilized even more effectively for the orientation process because the air current acts upon the work piece in defined regions. This also makes it possible to ensure a much more reliable orientation than that of devices known from the state of the art. In addition, it is possible to almost entirely prevent a resulting air current according to the state of the art that is directed transverse to the movement of the work pieces and decelerates the movement of the work piece.

It was determined that it is particularly effective to provide at least one additional air current that acts upon the work pieces and is directed in the moving direction of the work pieces. This additionally reduces the aerodynamic resistance of the work pieces and is particularly advantageous in the orientation of large and light work pieces. In addition, it is possible to prevent a deceleration of the work pieces even more effectively.

One particularly practical additional development of the device is characterized in that the air current is realized in the form of an air cushion that traverses the sliding surface. This air cushion results in an air current that makes it possible to orient the work pieces by utilizing their $C_w$-value or the position of center of gravity. The air cushion is also used as a medium for transporting the work pieces to an ensuing production system or an intermediate buffer.

Another particularly advantageous embodiment of the present invention is characterized in that the sliding surface is realized in the form of a flow element for the air current. This makes it possible to achieve the required inclination of the air current or air cushion, respectively.

In this respect, it is particularly practical that the flow element for the air current is adjustable. This adjustability makes it possible to vary or adapt the inclination of the air current in accordance with the geometry, properties and transport speed of the work pieces.

According to one particularly practical variation of the device, a perforated plate arranged above the flow element for the air current is assigned to the sliding surface. The perforated plate at least sectionally lies on the flow element for the air current in this case. This results in a surface on which the work pieces can be oriented and moved without impairment. The perforated plate is realized in such a way that the air current, particularly the inclination of the air cushion, is not altered.

It is particularly advantageous to arrange at least one blower or fan on the side of the sliding surface that faces away from the work piece. In comparison with compressed air, this blower makes it possible to generate an air current with significantly reduced turbulences that could impair the orientation process.

Another particularly advantageous additional development of the present invention is characterized in that a flow element is arranged between the blower and the sliding surface in order to uniformly distribute the blower air over the sliding surface. This flow element creates a flow resistance that evens out the inhomogeneous blower air over the sliding surface.

Another particularly advantageous embodiment of the device is characterized in that a second flow element is arranged between the first flow element and the sliding surface in order to adjust different flow speeds over the sliding surface. This makes it possible to vary the intensity of the air current or the air cushion over the length of the sliding surface. For example, when a work piece initially reaches the region of the air current, an intense air current is required in order to orient the work piece in the desired direction. The air current should be less intense at the end of the air cushion in order to stabilize the work piece before it is transferred to a downstream system.

In this case, it is particularly practical that the flow elements consist of at least two perforated plates that lie on top of one another and can be moved relative to one another. These perforated plates may be realized, for example, in the form of screen plates and respectively open different flow cross sections depending on the relative position between the openings in the two perforated plates. Consequently, different flow speeds can be adjusted over the sliding surface. It is preferred that one of the plates is arranged in a stationary fashion while the other plate can be displaced or turned in a plane that lies parallel to the stationary plate.

One particularly practical embodiment is characterized in that the flow elements respectively contain at least one adjusting element. These adjusting elements serve for adjusting the perforated plates relative to one another and simultaneously ensure that the perforated plates are fixed in the desired position.

The device according to the invention or the effect achieved therewith, respectively, is not only practical in the orientation or alignment on an air cushion, but also in the radial and axial orientation on a sliding surface that is inclined about two axes. The required continuous air current is realized in the form of a punctual, linear or planar air current in this case.

The invention can be realized in the form of different embodiments. One such embodiment is illustrated in the figures and described below in order to elucidate the basic principle of invention. The figures show:

DETAILED DESCRIPTION

Figure 1:
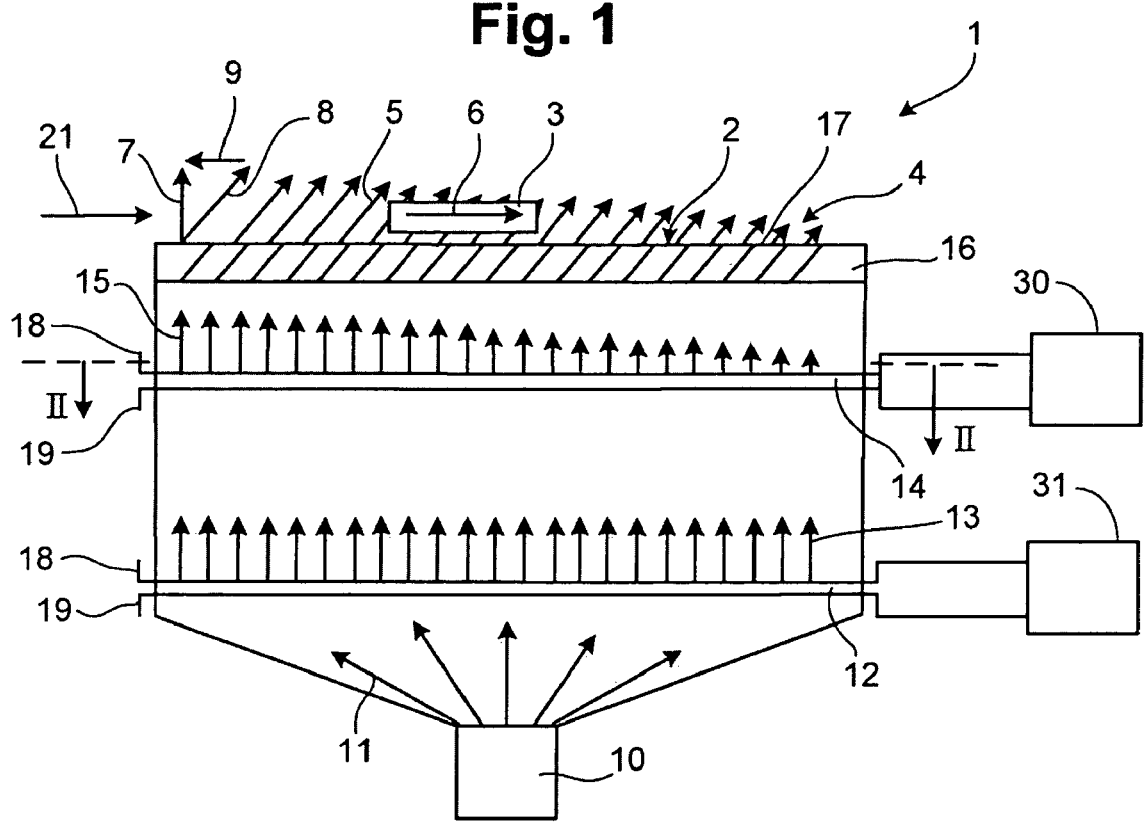
FIG. 1, a schematic representation of a device for orienting work pieces, and FIG. 2, the flow element according to FIG. 1 viewed in the direction II-II.

FIG. 1 shows a schematic representation of a device 1 for orienting work pieces being transported on a sliding surface 2 by means of an air current 4 in the form of an air cushion. The air current 4 has an effective direction 5 that is inclined relative to the moving direction 6 of the work piece 3. Consequently, an air current 7 resulting from the effective air current 8 and the air current 9 caused by the movement of the work pieces is directed perpendicular to the moving direction 6 of the work piece 3. In this case, the air current 9 caused by the movement of the work pieces corresponds to the aerodynamic resistance of the work piece 3 and therefore is directed opposite to the moving direction 6 of the work piece 3. The work piece 3 is also acted upon by another air current 21 that is directed in the moving direction 6 of the work piece 3.

The blower air 11 generated by the blower 10 is evened out by means of a first flow element 12 such that a homogenous flow field 13 is achieved as indicated with directional arrows of identical length. A flow profile 15 is realized with the aid of a second flow element 14. The directional arrows of the flow profile 15 that have different lengths cause different flow speeds within the flow profile 15. Consequently, the flow speed decreases in the moving direction 6 of the work piece 3.

An adjustable flow element 16 in the form of a honeycomb or lamellar element arranged underneath the sliding surface 2 is used for subsequently directing the flow profile 15 in such a way that the effective direction 5 of the air current 4 has the required inclination relative to the moving direction 6 of the work piece 3. A perforated plate 17 that at least partially lies on the flow element 16 is arranged above the adjustable flow element 16.

Figure 2:
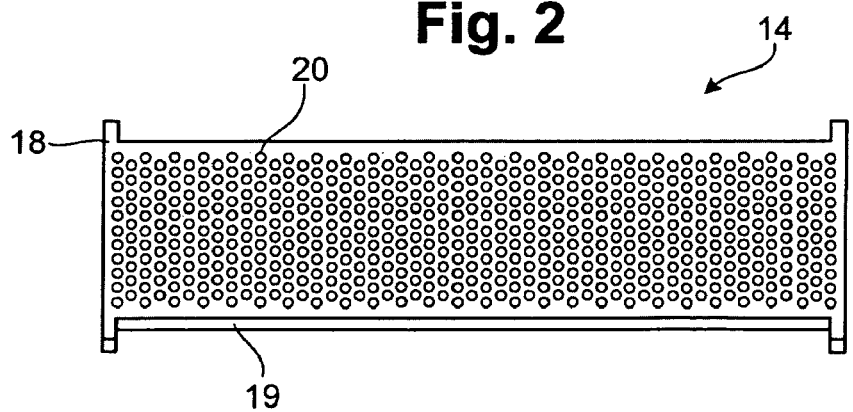

The flow elements 12, 14 are respectively formed by two perforated, plates 18, 19 that are arranged on top of one another and can be moved relative to one another. FIG. 2 shows the flow element 14 according to FIG. 1 in the form of a top view along the line II-II. The perforated plates 18, 19 are realized in the form of screen plates and contain a plurality of uniformly distributed openings 20. The largest opening cross section possible is adjusted when the perforated plates 18, 19 or the openings 20 of the two perforated plates 18, 19, respectively, are arranged on top .of one another in a precisely fitted fashion. The opening cross section can be varied by displacing the perforated plate 18 relative to the perforated plate 19, e.g., using a turning device 30. This makes it possible to adjust different opening cross sections and consequently different flow speeds over the entire surface of the flow element 14. A device 31 can be provided to effectuate relative movement of the perforated plates of the flow element 12.

The invention claimed is:

1. A device for realizing a predetermined orientation of singularlized work pieces being transported on a sliding surface, the device comprising:

a device configured to deliver a first air current to the sliding surface, a first flow element configured to uniformly distribute the air current over the sliding surface, the first flow element comprising at least two perforated plates that lie on top of one another and can be moved relative to one another, a second flow element configured to realize a flow profile, the second flow element comprising a pair of perforated plates arranged on top of one another, at least one of the plates being configured to be turned relative to the other plate in a plane that lies parallel to the other plate, and a guiding element configured to direct the flow profile so that the first air current is inclined relative to a moving direction of the workpieces in such a way that a resulting air current resulting from the air current delivered by the device and the movement of the work pieces extends perpendicular to the moving direction of the work pieces.

2. The device according to claim 1, further comprising at least one other air current that acts upon the work pieces and is directed in the moving direction of the work pieces.

3. The device according to claim 1 wherein the first air current is realized in the form of an air cushion that traverses the sliding surface.

4. The device according to claim 1 wherein the sliding surface is defined by the guiding element.

5. The device according to claim 1, wherein the guiding element is adjustable.

6. The device according to claim 5 further comprising a perforated plate arranged above the guiding element and defining the sliding surface.

7. The device according to claim 1 further comprising at least one blower or fan arranged on the side of the sliding surface that faces away from the work pieces.

8. The device according to claim 7 further wherein the first flow element is arranged between the blower or fan and the sliding surface to evenly distribute air delivered by the blower or fan over the sliding surface.

9. The device according to claim 8 wherein the second flow element is arranged between the first flow element and the sliding surface to allow adjustment of flow speed over the sliding surface.

10. A method of orienting a plurality of moving work pieces, comprising
    applying a first air current to the work pieces to orient the work pieces in a predetermined orientation direction along a sliding surface, while
    directing the first air current so that the first air current has an effective direction that is inclined relative to the moving direction of the work pieces so that a resulting air current resulting from the first air current and the movement of the work pieces extends perpendicular to the moving direction of the work pieces,
    uniformly distributing the air current over the sliding surface using a first flow element comprising a pair of perforated plates,
    realizing a flow profile over the sliding surface using a second flow element comprising a pair of perforated plates, by turning one of the perforated plates relative to the other, and
    directing the flow profile so that the first air current is inclined relative to the moving direction of the workpieces using a third flow element.

11. The method of claim 10, further comprising applying at least a second air current to the work pieces, the second air current being directed in the moving direction of the work pieces.

12. The method of claim 10 further comprising providing the first air current in the form of an air cushion that traverses the sliding surface.

13. A device for orienting work pieces being transported on a sliding surface, the device comprising:
    a device configured to deliver a first air current to the sliding surface,
    a first flow element configured to uniformly distribute the first air current over the sliding surface,
    a second flow element configured to realize a flow profile,
    the first flow element and second flow element each comprising two perforated plates arranged on top of one another and that can be moved relative to each other, and
    a guiding element configured to direct the flow profile so that the first air current is inclined relative to a moving direction of the workpieces in such a way that a resulting air current resulting from the first air current and the movement of the work pieces extends perpendicular to the moving direction of the work pieces.

14. The device of claim 13 wherein at least one of the pairs of co-acting perforated plates is adjustable.

* * * * *